(12) United States Patent
Chen (10) Patent No.: US 11,470,457 B2
(45) Date of Patent: Oct. 11, 2022

(54) METHOD, APPARATUS AND COMPUTER PROGRAM

(71) Applicant: Nokia Technologies Oy, Espoo (FI)

(72) Inventor: Yejian Chen, Stuttgart (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 44 days.

(21) Appl. No.: 16/770,971

(22) PCT Filed: Dec. 11, 2018

(86) PCT No.: PCT/EP2018/084412
§ 371 (c)(1),
(2) Date: Jun. 9, 2020

(87) PCT Pub. No.: WO2019/115554
PCT Pub. Date: Jun. 20, 2019

(65) Prior Publication Data
US 2021/0076178 A1 Mar. 11, 2021

(30) Foreign Application Priority Data
Dec. 12, 2017 (EP) .................................... 17206560

(51) Int. Cl.
*H04W 4/40* (2018.01)
*H04L 67/125* (2022.01)
*H04W 84/00* (2009.01)

(52) U.S. Cl.
CPC ............. *H04W 4/40* (2018.02); *H04L 67/125* (2013.01); *H04W 84/005* (2013.01)

(58) Field of Classification Search
CPC .... H04B 7/063; H04B 7/0452; H04B 7/0689; H04B 7/0854; H04L 25/0204; H04L 67/125; H04W 4/40; H04W 88/06
See application file for complete search history.

(56) References Cited

U.S. PATENT DOCUMENTS

| 6,603,426 B1 | 8/2003 | Clark | |
| 2013/0080050 A1* | 3/2013 | McKitterick | G01S 13/89 701/466 |

(Continued)

FOREIGN PATENT DOCUMENTS

| EP | 0836292 A2 | 4/1998 |
| WO | 2015/191367 A1 | 12/2015 |

(Continued)

OTHER PUBLICATIONS

Office Action received for corresponding European Patent Application No. 17206560.9, dated Feb. 23, 2021, 4 pages.

(Continued)

*Primary Examiner* — Walter J Divito
(74) *Attorney, Agent, or Firm* — Alston & Bird LLP (57) ABSTRACT

There is provided a method comprising a method comprising receiving a plurality of signals at a first receiver of a plurality of first receivers associated with a vehicle. At least one of the plurality of signals comprises at least one message. The method comprises processing the plurality of signals to determine the at least one message and providing the at least one message to a controller. The controller is configured to verify the at least one message for use in determining vehicle action.

15 Claims, 6 Drawing Sheets

(56) References Cited

U.S. PATENT DOCUMENTS

| | | | |
|---|---|---|---|
| 2014/0035774 A1 | 2/2014 | Khlifi | |
| 2015/0349801 A1* | 12/2015 | Park | H03M 13/6583 |
| | | | 714/752 |
| 2016/0267792 A1 | 9/2016 | Nusser et al. | |
| 2016/0277513 A1 | 9/2016 | Kim et al. | |
| 2016/0277941 A1 | 9/2016 | Kim et al. | |
| 2016/0277997 A1 | 9/2016 | Kang et al. | |
| 2017/0134080 A1 | 5/2017 | Rahman et al. | |
| 2017/0214655 A1 | 7/2017 | Bhushan et al. | |
| 2018/0131454 A1* | 5/2018 | Hong | H04L 25/03184 |
| 2018/0309601 A1* | 10/2018 | Kim | H04L 25/03828 |

FOREIGN PATENT DOCUMENTS

| | | |
|---|---|---|
| WO | 2017/117340 A1 | 7/2017 |
| WO | 2017/146534 A1 | 8/2017 |

OTHER PUBLICATIONS

Franke et al., "Autonomous Driving Goes Downtown", IEEE Intelligent Systems and their Applications, vol. 13, No. 6, Nov.-Dec. 1998, pp. 40.48.

Wei et al., "Towards A Viable Autonomous Driving Research Platform", IEEE Intelligent Vehicles Symposium (IV), Jun. 23-26, 2013, pp. 763-770.

Ziegler et al., "Making Bertha Drive—An Autonomous Journey on a Historic Route", IEEE Intelligent Transportation Systems Magazine, vol. 6, No. 2, 2014, pp. 8-20.

Chen et al., "DeepDriving: Learning Affordance for Direct Perception in Autonomous Driving", IEEE International Conference on Computer Vision (ICCV), Dec. 7-13, 2015, pp. 2722-2730.

Dai et al., "Non-Orthogonal Multiple Access For 5G: Solutions, Challenges, Opportunities, and Future Research Trends", IEEE Communications Magazine, vol. 53, No. 9, Sep. 2015, pp. 74-81.

Di et al., "V2X Meets Noma: Non-orthogonal Multiple Access for 5G Enabled Vehicular Networks", arXiv, May 24, 2017, pp. 1-18.

Di et al., "Non-orthogonal Multiple Access for High-reliable and Low-latency V2X Communications in 5G Systems", arXiv, May 24, 2017, pp. 1-32.

Extended European Search Report received for corresponding European Patent Application No. 17206560.9, dated May 29, 2018, 7 pages.

International Search Report and Written Opinion received for corresponding Patent Cooperation Treaty Application No. PCT/EP2018/084412, dated Apr. 8, 2019, 15 pages.

Office Action for European Application No. 17206560.9 dated Aug. 1, 2022, 4 pages.

* cited by examiner

METHOD, APPARATUS AND COMPUTER PROGRAM

RELATED APPLICATION

This application claims priority to PCT Application No., PCT/EP2018/084412 filed on Dec. 11, 2018, which claims priority to European Application No. 17206560.9, filed on Dec. 12, 2017, each of which is incorporated herein by reference in its entirety.

FIELD

The present application relates to a method, apparatus, system and computer program and in particular, but not exclusively, to processing messages in an autonomous driving system.

BACKGROUND

Autonomous driving is the concept of operating a vehicle that is capable of sensing its environment without human input. With developments in digital chip design, image processing techniques, localization techniques, artificial intelligence, and so on, the concept of autonomous driving is becoming realisable.

Research for autonomous driving may be focused on the super computer visualization capability of a vehicle, to achieve secure driving. One aspect of the visualisation is to make use of the developing Internet of Things (IoT) to broadcast information from the "environment" (e.g. roadside units).

Autonomous vehicles use a variety of sensing techniques to detect their surroundings, such as GPS, cameras, Radar, LIDAR and odometry. The sensing techniques are used to perform measurements of the surrounding environment. Alternatively, or in addition, autonomous vehicles may receive messages comprising measurement information broadcast from the surrounding environment, e.g. vehicles, roadside units and/or pedestrians. Measurements performed in the environment may be more precise than measurements performed at the vehicle.

Control systems interpret the information gathered by sensors at the vehicle and received from external sources to identify appropriate navigation paths, as well as obstacles and relevant signage. The costs of equipping a vehicle to receive and detect surrounding environment information may be significant.

SUMMARY

In a first aspect there is provided a method comprising receiving a plurality of signals at a first receiver of a plurality of first receivers associated with a vehicle, at least one of the plurality of signals comprising at least one message, processing the plurality of signals to determine the at least one message and providing the at least one message to a controller, the controller configured to verify the at least one message for use in determining vehicle action.

The method may comprise processing the plurality of signals using non-orthogonal multiple access processing.

The plurality of first receivers may comprise a plurality of non-orthogonal multiple access detectors.

The non-orthogonal multiple access detectors may be low-cost non-orthogonal multiple access detectors.

The controller may comprise a high-cost non-orthogonal multiple access detector.

The at least one message may be safety critical.

The at least one message may comprise measurement reports

The method may comprise receiving the plurality of signals from at least one of roadside infrastructure and another vehicle.

The method may comprise receiving the plurality of signals using a device to device communication protocol.

The controller may be configured to verify the at least one message using a log-likelihood ratio.

In a second aspect there is provided a method comprising receiving at least one message from at least one first receiver of a plurality of first receivers associated with a vehicle, the at least one message determined by processing a plurality of signals received at the at least one first receiver and verifying the at least one message for use in determining vehicle action.

The plurality of signals may be processed using non-orthogonal multiple access processing.

The plurality of first receivers may comprise a plurality of non-orthogonal multiple access detectors.

The non-orthogonal multiple access detectors may be low-cost non-orthogonal multiple access detectors.

The controller may comprise a high-cost non-orthogonal multiple access detector.

The at least one message may be safety critical.

The at least one message may comprise measurement reports

The plurality of signals may be received from at least one of roadside infrastructure and another vehicle.

The plurality of signals may be received using a device to device communication protocol.

The controller may be configured to verify the at least one message using a log-likelihood ratio.

In a third aspect there is provided a system for a vehicle comprising a plurality of first receivers associated with the vehicle, each first receiver configured to receive a plurality of signals, at least one of the plurality of signals comprising at least one message, process the plurality of signals to determine the at least one message, provide the at least one message to a controller and the controller in communication with the plurality of first detectors configured to verify the at least one message for use in determining vehicle action.

The first receiver may be configured to process the plurality of signals using non-orthogonal multiple access processing.

The plurality of first receivers may comprise a plurality of non-orthogonal multiple access detectors.

The non-orthogonal multiple access detectors may be low-cost non-orthogonal multiple access detectors.

The controller may comprise a high-cost non-orthogonal multiple access detector.

The at least one message may be safety critical.

The at least one message may comprise measurement reports

The first receiver may be configured to receive the plurality of signals from at least one of roadside infrastructure and another vehicle.

The first receiver may be configured to receive the plurality of signals using a device to device communication protocol.

The controller may be configured to verify the at least one message using a log-likelihood ratio.

In a fourth aspect there is provided an apparatus, said apparatus comprising means for receiving a plurality of signals at a first receiver of a plurality of first receivers associated with a vehicle, at least one of the plurality of signals comprising at least one message, means for processing the plurality of signals to determine the at least one message and means for providing the at least one message to a controller, the controller configured to verify the at least one message for use in determining vehicle action.

The apparatus may comprise means for processing the plurality of signals using non-orthogonal multiple access processing.

The plurality of first receivers may comprise a plurality of non-orthogonal multiple access detectors.

The non-orthogonal multiple access detectors may be low-cost non-orthogonal multiple access detectors.

The controller may comprise a high-cost non-orthogonal multiple access detector.

The at least one message may be safety critical.

The at least one message may comprise measurement reports.

The apparatus may comprise means for receiving the plurality of signals from at least one of roadside infrastructure and another vehicle.

The apparatus may comprise means for receiving the plurality of signals using a device to device communication protocol.

The controller may be configured to verify the at least one message using a log-likelihood ratio.

In a fifth aspect there is provided an apparatus comprising means for receiving at least one message from at least one first receiver of a plurality of first receivers associated with a vehicle, the at least one message determined by processing a plurality of signals received at the at least one first receiver and means for verifying the at least one message for use in determining vehicle action.

The plurality of signals may be processed using non-orthogonal multiple access processing.

The plurality of first receivers may comprise a plurality of non-orthogonal multiple access detectors.

The non-orthogonal multiple access detectors may be low-cost non-orthogonal multiple access detectors.

The controller may comprise a high-cost non-orthogonal multiple access detector.

The at least one message may be safety critical.

The at least one message may comprise measurement reports

The plurality of signals may be received from at least one of roadside infrastructure and another vehicle.

The plurality of signals may be received using a device to device communication protocol.

The controller may be configured to verify the at least one message using a log-likelihood ratio.

In a sixth aspect there is provided an apparatus comprising at least one processor and at least one memory including a computer program code, the at least one memory and the computer program code configured to, with the at least one processor, cause the apparatus at least to: receive a plurality of signals at a first receiver of a plurality of first receivers associated with a vehicle, at least one of the plurality of signals comprising at least one message, process the plurality of signals to determine the at least one message and provide the at least one message to a controller, the controller configured to verify the at least one message for use in determining vehicle action.

The apparatus may be configured to process the plurality of signals using non-orthogonal multiple access processing.

The plurality of first receivers may comprise a plurality of non-orthogonal multiple access detectors.

The non-orthogonal multiple access detectors may be low-cost non-orthogonal multiple access detectors.

The controller may comprise a high-cost non-orthogonal multiple access detector.

The at least one message may be safety critical.

The at least one message may comprise measurement reports

The apparatus may be configured to receive the plurality of signals from at least one of roadside infrastructure and another vehicle.

The first receiver may be configured to receive the plurality of signals using a device to device communication protocol.

The controller may be configured to verify the at least one message using a log-likelihood ratio.

In a seventh aspect there is provided an apparatus comprising at least one processor and at least one memory including a computer program code, the at least one memory and the computer program code configured to, with the at least one processor, cause the apparatus at least to receive at least one message from at least one first receiver of a plurality of first receivers associated with a vehicle, the at least one message determined by processing a plurality of signals received at the at least one first receiver and verify the at least one message for use in determining vehicle action.

The plurality of signals may be processed using non-orthogonal multiple access processing.

The plurality of first receivers may comprise a plurality of non-orthogonal multiple access detectors.

The non-orthogonal multiple access detectors may be low-cost non-orthogonal multiple access detectors.

The controller may comprise a high-cost non-orthogonal multiple access detector.

The at least one message may be safety critical.

The at least one message may comprise measurement reports

The plurality of signals may be received from at least one of roadside infrastructure and another vehicle.

The plurality of signals may be received using a device to device communication protocol.

The controller may be configured to verify the at least one message using a log-likelihood ratio.

In an eighth aspect there is provided a computer program embodied on a non-transitory computer-readable storage medium, the computer program comprising program code for controlling a process to execute a process, the process comprising receiving a plurality of signals at a first receiver of a plurality of first receivers associated with a vehicle, at least one of the plurality of signals comprising at least one message, processing the plurality of signals to determine the at least one message and providing the at least one message to a controller, the controller configured to verify the at least one message for use in determining vehicle action.

The process may comprise processing the plurality of signals using non-orthogonal multiple access processing.

The plurality of first receivers may comprise a plurality of non-orthogonal multiple access detectors.

The non-orthogonal multiple access detectors may be low-cost non-orthogonal multiple access detectors.

The controller may comprise a high-cost non-orthogonal multiple access detector.

The at least one message may be safety critical.

The at least one message may comprise measurement reports

The process may comprise receiving the plurality of signals from at least one of roadside infrastructure and another vehicle.

The process may comprise receiving the plurality of signals using a device to device communication protocol.

The controller may be configured to verify the at least one message using a log-likelihood ratio.

In an ninth aspect there is provided a computer program embodied on a non-transitory computer-readable storage medium, the computer program comprising program code for controlling a process to execute a process, the process comprising receiving at least one message from at least one first receiver of a plurality of first receivers associated with a vehicle, the at least one message determined by processing a plurality of signals received at the at least one first receiver and verifying the at least one message for use in determining vehicle action.

The plurality of signals may be processed using non-orthogonal multiple access processing.

The plurality of first receivers may comprise a plurality of non-orthogonal multiple access detectors.

The non-orthogonal multiple access detectors may be low-cost non-orthogonal multiple access detectors.

The controller may comprise a high-cost non-orthogonal multiple access detector.

The at least one message may be safety critical.

The at least one message may comprise measurement reports

The plurality of signals may be received from at least one of roadside infrastructure and another vehicle.

The plurality of signals may be received using a device to device communication protocol.

The controller may be configured to verify the at least one message using a log-likelihood ratio.

In a tenth aspect there is provided a computer program product for a computer, comprising software code portions for performing the steps the method of the first aspect when said product is run on the computer.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

A fundamental aspect in developing autonomous driving is safety. A vehicle must be able to receive safety critical messages from the surrounding environment with high reliability and process those messages with low latency so they may be acted upon in sufficient time.

To support various applications, an integrated system of the vehicular networking, known as vehicle-to-everything (V2X), has been proposed to enable vehicles to communicate with each other and beyond. V2X provides three types of communications, vehicle-to-vehicle (V2V), vehicle-to-pedestrian (V2P), and vehicle-to-infrastructure/network (V2I/N) referring to the communication between a vehicle and a roadside unit/network.

The non-orthogonal multiple access (NOMA) technique is recognised as a solution for 5G or NR networks to provide a multi user access scheme. NOMA allows users to access a channel non-orthogonally by either power domain or code domain multiplexing. The applicability of NOMA in supporting cellular V2X communications has been considered.

Current discussions of NOMA are based on a single receiver (RX) element. From the view point of a single RX, the detector will always begin with the signal component with strongest power. However, a vehicle equipped for autonomous driving may comprise a number of receivers at different positions on the vehicle. Therefore, a safety-critical message may be detected more than once. It may be desirable to reduce missed detections, as well as to verify messages to avoid false alarms.

For example, a vehicle configured for autonomous driving may be comprise a receiver. The receiver receives a plurality of signals broadcast from the "environment", e.g. roadside units, pedestrians or other vehicles. The signals may be superimposed. The signals may comprise messages such that a superposition of messages is received at the receiver. The messages may comprise measurement reports. At least some of the messages may be safety critical.

The report of measurements may be sporadic and asynchronous. As a result, the plurality of signals may be processed using NOMA to resolve the superposition of the messages at the receiver. The receiver may perform NOMA detection individually and independently.

NOMA decoders have a relatively high computational requirement, in order to separate the superimposed signals. Therefore, the detection may involve an iterative algorithm without any a priori information. Low-cost detectors which do not use a priori information, may forward "false-alarms", which means the safety-threat does not exist at all.

However, a high-cost detector, which makes use of a priori information and thus has a higher computational requirements, may not be able to be mounted at any position of the car. Thus, the quality of signal detections from a high-cost detector may be lower than from low-cost detector.

Figure 1:
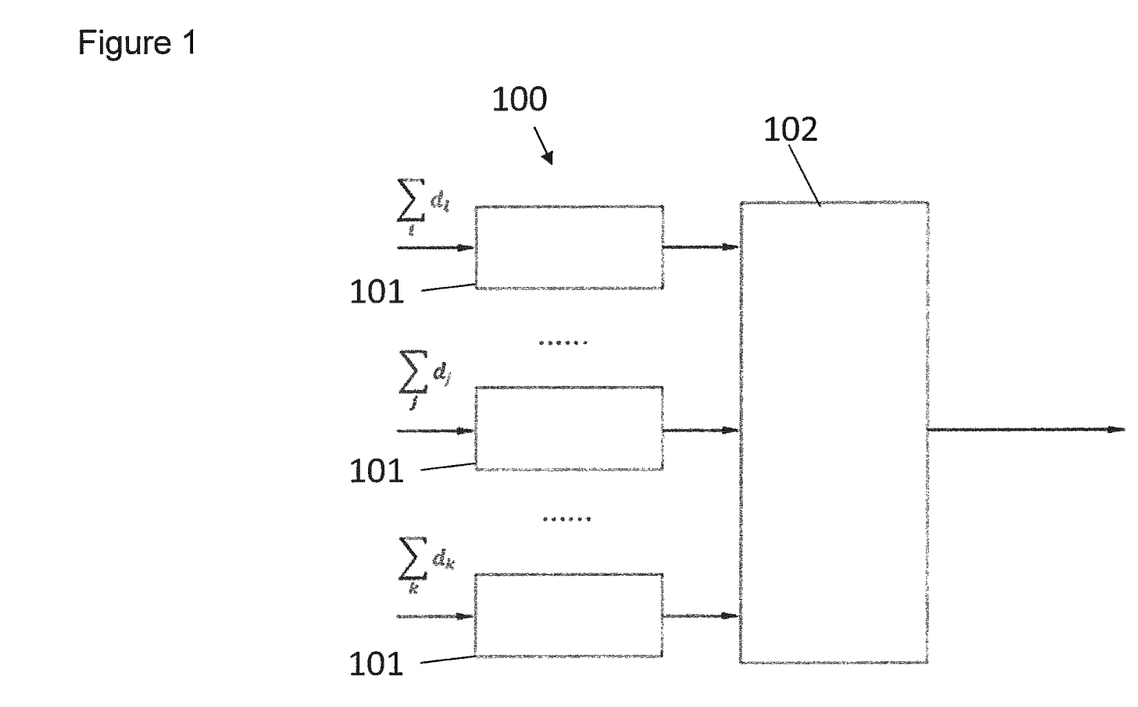
FIG. 1 shows a schematic diagram of a system according to embodiments.

A system 100 for use on a vehicle according to one example is shown in FIG. 1. The system 100 comprises a plurality of first receivers 101 associated with the vehicle. Each first receiver 101 is configured to receive a plurality of signals, at least one of the plurality of signals comprising at least one message. The system 100 includes a controller 102 in communication with the plurality of first receivers 101. The controller 102 is configured to verify the at least one message for use in determining vehicle action.

The signals may be broadcast from different sources of infrastructure, according to a given communication standard or protocol, so that a control system of the vehicle knows the data format and can decode the signals.

The first receivers and the controller may comprise NOMA detectors. The first receivers 101 may be low-cost NOMA detectors. The controller 102 may be a high-cost NOMA detector. Relative costs refer to both energy costs as well as economic costs.

A low-cost detector may use a power division NOMA scheme, in which the signal with stronger power level will be firstly detected, decoded and subtracted from the receive signal. Then the signal with second strongest power level will be processed, and so on.

A high-cost detector may use an iterative processing structure. After the interference cancellation (as that described above for low-cost detector), a next iteration could be started to detect all the signals again. With this, the reliability of the detection may be improved for the streams. However, the costs associated with the detector increase.

In use, the first receivers 101 receive a superposition of signals $\Sigma_i d_i$. The signals may include at least one message. The at least one message may comprise measurements reports of the surrounding environment. At least some of the messages may be safety critical messages.

The plurality of signals may be broadcast from roadside infrastructure or another vehicle. The signals may be broadcast using a device-to-device protocol. From the perspective of the vehicle the signals are provided in a NOMA system. The broadcasting infrastructure may or may not know that the signals are being processed using NOMA.

Since the first receivers are low-cost, a number of them may be included on the vehicle such that the missed detection probability is reduced. The detection of messages will also be fast.

The receivers 101 are configured to process the received plurality of signals to determine the message carried by the signal. Processing the plurality of signals may comprise resolving superimposed signals using NOMA. The receiver is configured to provide the determined at least one message to the controller 102. The controller 102 processes the received messages to verify the message for use in determining vehicle action. The verified messages may be provided to a vehicle control system for action. The verification may be faster than detection, to meet low latency requirements.

During the verification performed by the second detector, a priori information is available. The a priori information may comprises a log-likelihood ratio. The high-cost detector may check the plausibility of the received messages. The verification may use an intelligent algorithm, e.g. a learning algorithm, to evaluate the log-likelihood-ratio to make the final verification decision.

Figure 2:
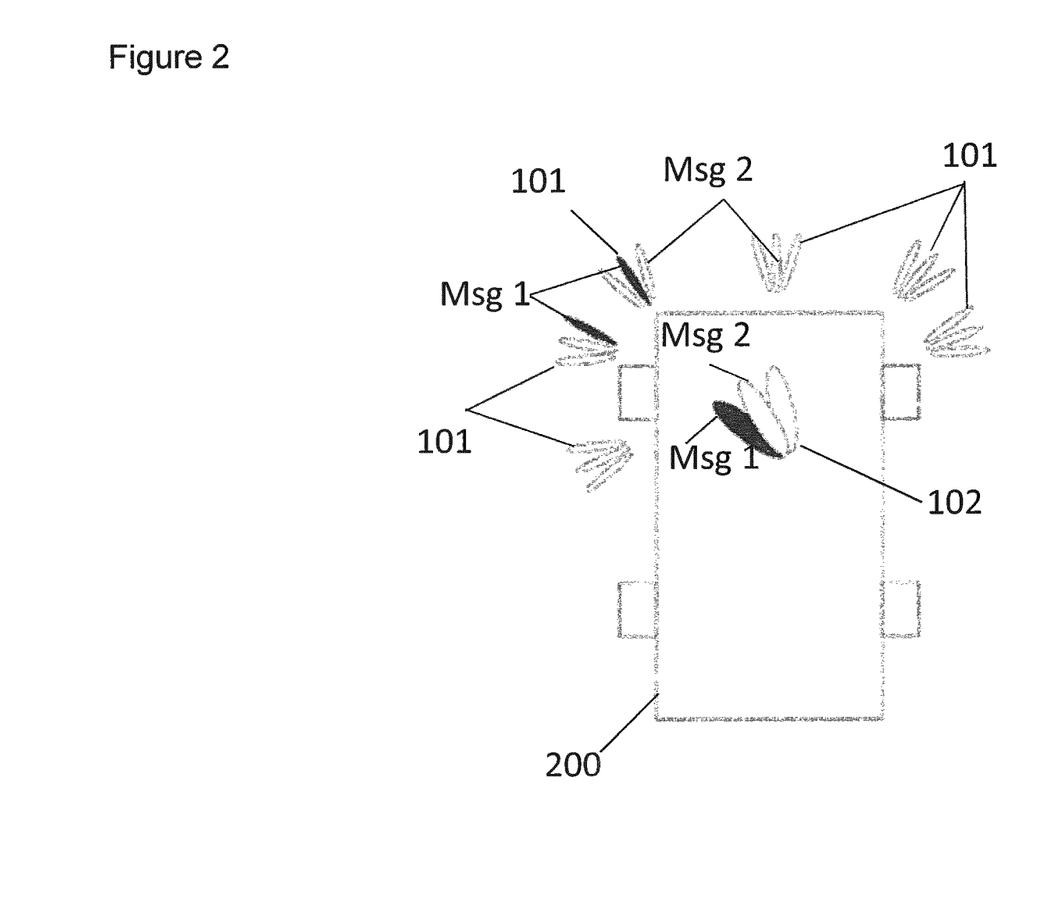
FIG. 2 shows a schematic diagram of a system in use on a vehicle in accordance with embodiments.

FIG. 2 shows a vehicle 200 including a system as described with reference to FIG. 1. Message 1 is received at a first receiver and second receiver 101, while message 2 is received at the second receiver 101 and a third receiver 101. Both messages 1 and 2 are then provided to the controller 102. Although only the second receiver 101 receives both messages 1 and 2, because of the plurality of receivers 101, the chances of missed detection are reduced.

Figure 3:
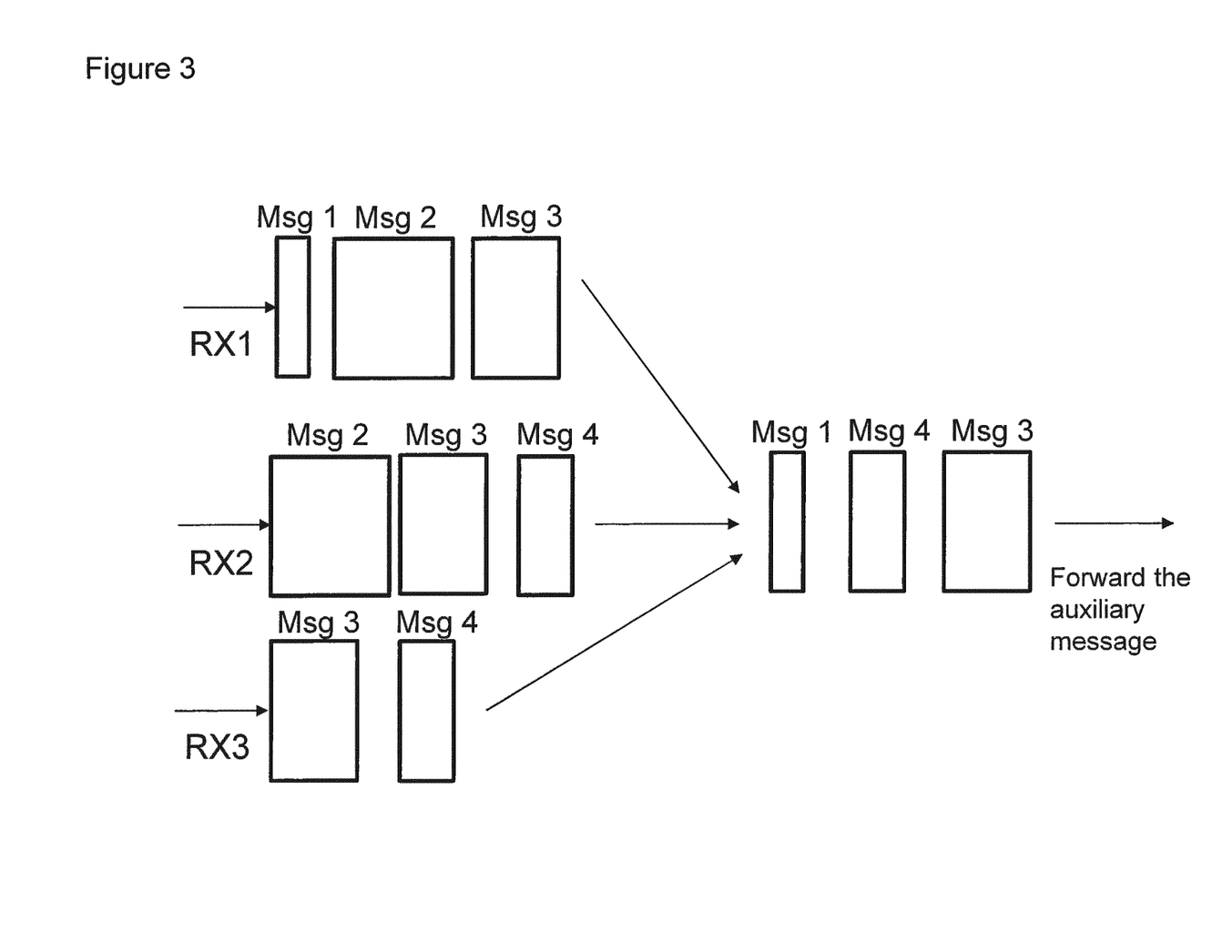
FIG. 3 shows a block diagram of message processing in accordance with embodiments.

FIG. 3 is a block diagram showing a system in which messages 1, 2 and 3 are received at receiver 1, messages 2, 3 and 4 are received at receiver 2 and messages 3 and 4 are received at receiver 3. The messages are resolved and provided to the second detector. The second detector verifies that message 2 is a false alarm and messages 1, 3 and 4 are to be forwarded for action.

Figure 4:
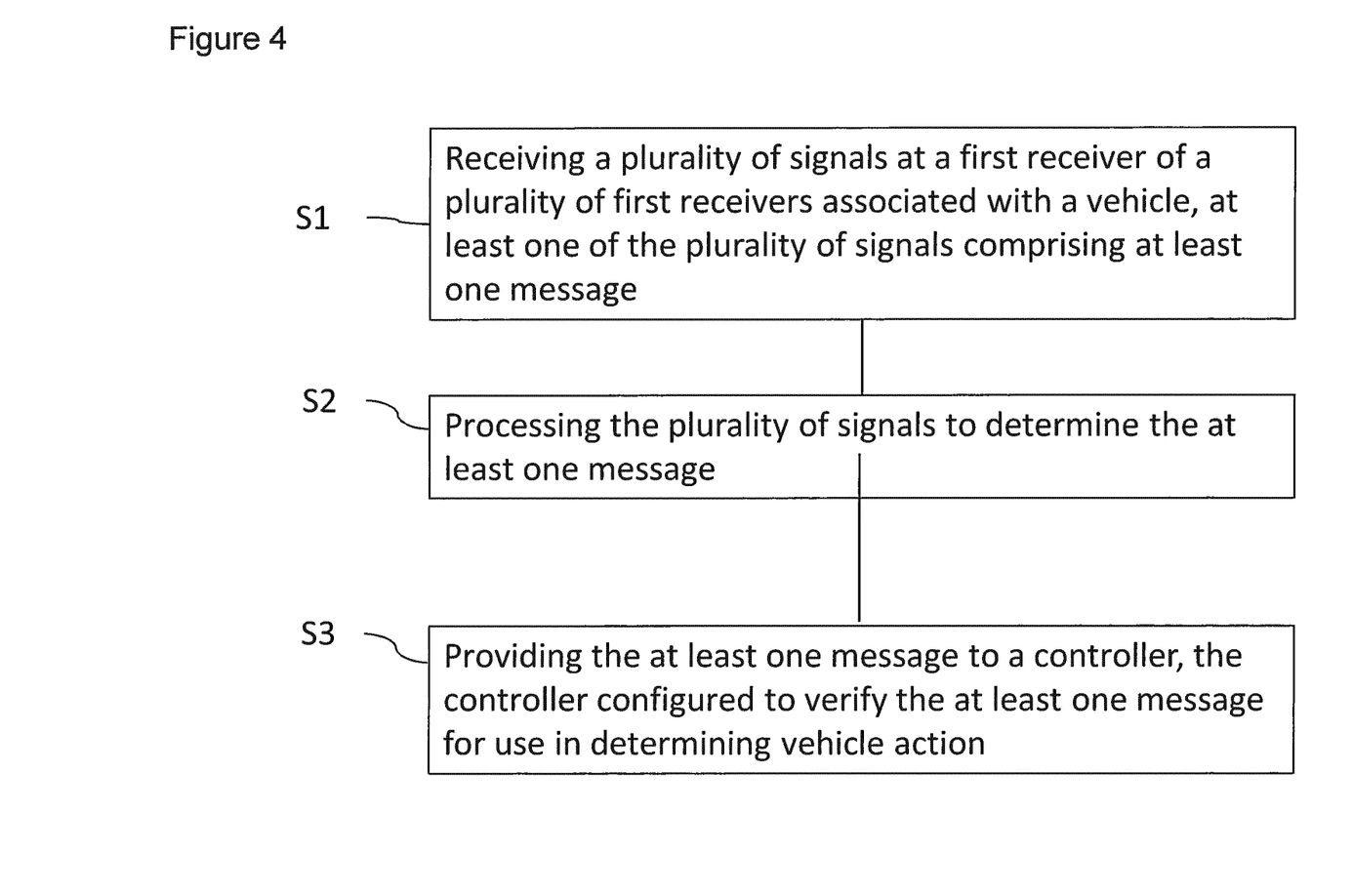
FIG. 4 shows a flow chart of a method in accordance with embodiments.

FIG. 4 is a flow chart of a method according to embodiments. In a first step, S1, the method comprises receiving a plurality of signals at a first receiver of a plurality of first receivers associated with a vehicle, at least one of the plurality of signals comprising at least one message.

In a second step, S2, the method comprises processing the plurality of signals to determine the at least one message.

In a third step, S3, the method comprises providing the at least one message to a controller, the controller configured to verify the at least one message for use in determining vehicle action.

Figure 5:
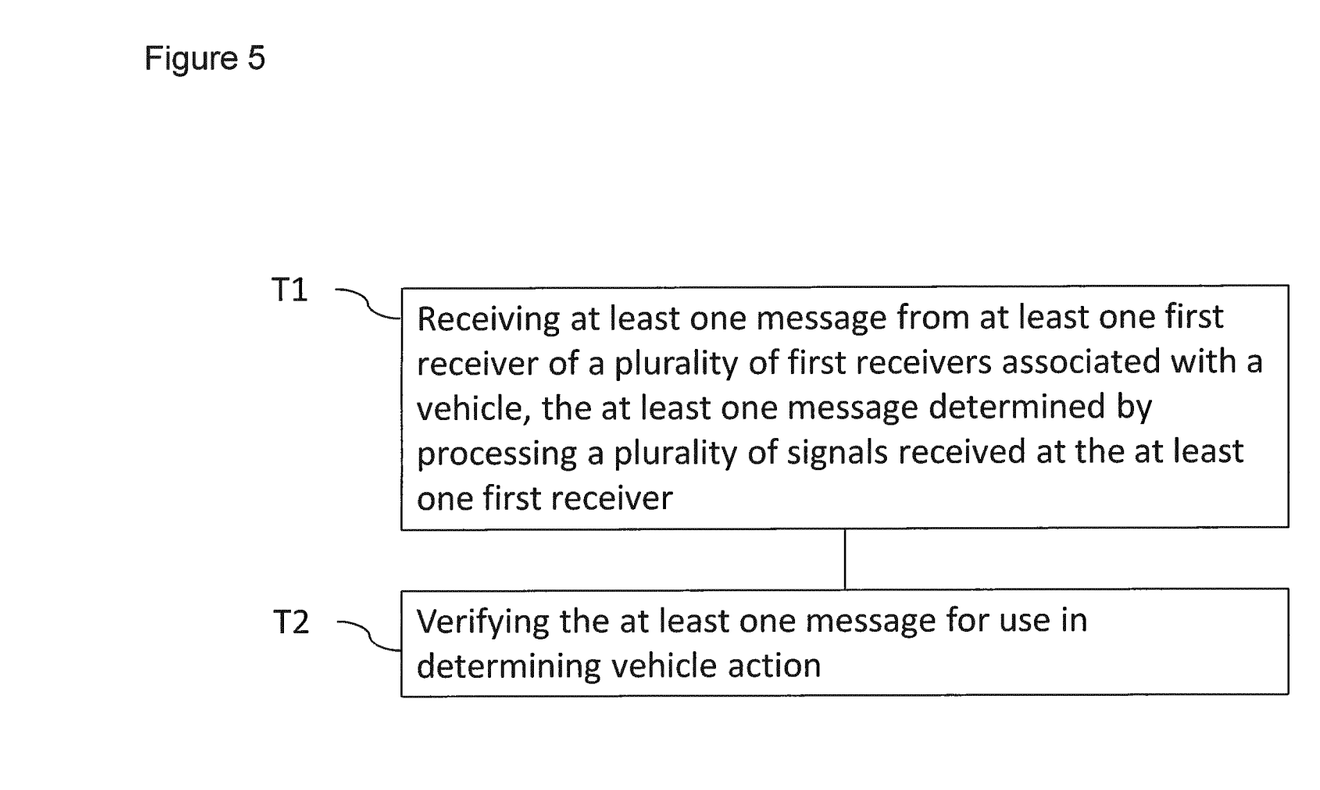
FIG. 5 shows a flow chart of a method in accordance with embodiments.

FIG. 5 is a flowchart of a method according to embodiments. In a first step, T1, the method comprises receiving at least one message from at least one first receiver of a plurality of first receivers associated with a vehicle, the at least one message determined by processing a plurality of signals received at the at least one first receiver.

In a second step, T2, the method comprises verifying the at least one message for use in determining vehicle action.

A system as described herein thus provides a mechanism for safety control, which may reduce missed detection probability of a safety-critical message, while verifying messages to avoid false alarms, under the cost constraints of commercializing autonomous driving.

It should be understood that each block of the flowchart of FIGS. 4 and 5 and any combination thereof may be implemented by various means or their combinations, such as hardware, software, firmware, one or more processors and/or circuitry.

Figure 6:
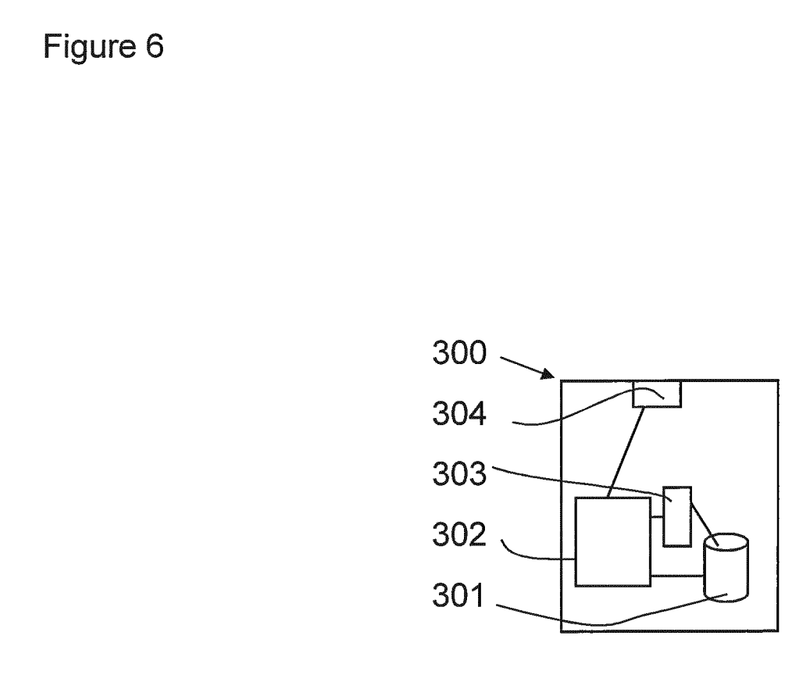
FIG. 6 shows a schematic diagram of an example control apparatus.

FIG. 6 shows an example of a control apparatus for a communication system, for example to be coupled to and/or for controlling a receiver of a communication system. A method as disclosed herein may be performed in a single control apparatus or across more than one control apparatus. The control apparatus may be integrated with or external to a receiver. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the access point. The receiver and/or the transmitter may be implemented as a radio front end or a remote radio head.

The methods may be implemented on a control apparatus as shown in FIG. 6.

Control functions may comprise a method comprising receiving a plurality of signals at a first receiver of a plurality of first receivers associated with a vehicle, at least one of the plurality of signals comprising at least one message, processing the plurality of signals to determine the at least one message and providing the at least one message to a controller, the controller configured to verify the at least one message for use in determining vehicle action.

Alternatively, or in addition, control functions may comprise receiving at least one message from at least one first receiver of a plurality of first receivers associated with a vehicle, the at least one message determined by processing a plurality of signals received at the at least one first receiver and verifying the at least one message for use in determining vehicle action.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to V2X NOMA communication, similar principles can be applied in relation to other networks and communication systems where a number of safety critical messages are received. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
   receiving a plurality of signals at a first receiver of a plurality of first receivers for use on a vehicle, at least one of the plurality of signals comprising at least one message, wherein the first receiver is a detector configured to process the plurality of signals by resolving superimposed signals without a priori information;
   processing the plurality of signals to determine the at least one message; and
   providing the at least one message to a controller for use on the vehicle, the controller comprising a detector configured to use a priori information to check plausibility of the at least one message for use in determining vehicle action, wherein the a priori information comprises a log-likelihood ratio.

2. A method of claim 1, comprising processing the plurality of signals using non-orthogonal multiple access processing.

3. A method of claim 2, wherein the plurality of first receivers comprise a plurality of non-orthogonal multiple access detectors.

4. A method of claim 2, wherein the controller comprises a non-orthogonal multiple access detector.

5. A method of claim 1, wherein the at least one message comprises measurement reports.

6. A method of claim 1, comprising receiving the plurality of signals from at least one of roadside infrastructure and another vehicle.

7. A method of claim 1, comprising receiving the plurality of signals using a device to device communication protocol.

8. An apparatus comprising:
   at least one processor and
   at least one non-volatile memory including a computer program code, the at least one memory and the computer program code configured to, with the at least one processor, cause the apparatus at least to:
   receive a plurality of signals at a first receiver of a plurality of first receivers associated with a vehicle, at least one of the plurality of signals comprising at least one message, wherein the first receiver is a detector configured to process the plurality of signals by resolving superimposed signals without a priori information;
   process the plurality of signals to determine the at least one message; and
   provide the at least one message to a controller, the controller comprising a detector configured to use a priori information to verify the at least one message for use in determining vehicle action, wherein the a priori information comprises a log likelihood ratio.

9. The apparatus of claim 8, wherein the apparatus is further configured to process the plurality of signals using non-orthogonal multiple access processing.

10. The apparatus of claim 9, wherein he plurality of first receivers comprise a plurality of non-orthogonal multiple access detectors.

11. The apparatus of claim 9, wherein the controller comprises a non-orthogonal multiple access detector.

12. The apparatus of claim 8, wherein the at least one message comprises measurement reports.

13. The apparatus of claim 8, wherein the apparatus is further configured to receive the plurality of signals from at least one of roadside infrastructure and another vehicle.

14. The apparatus of claim 8, wherein the first receiver is further configured to receive the plurality of signals using a device to device communication protocol.

15. A non-transitory computer readable medium having stored thereon software instructions that, when executed by a processor, cause the processor to:
  receive a plurality of signals at a first receiver of a plurality of first receivers for use on a vehicle, at least one of the plurality of signals comprising at least one message, wherein the first receiver is a detector configured to process the plurality of signals by resolving superimposed signals without a priori information;
  process the plurality of signals to determine the at least one message; and
  provide the at least one message to a controller for use on the vehicle, the controller comprising a detector configured to use a priori information to check plausibility of the at least one message for use in determining vehicle action, wherein the a priori information comprises a log-likelihood ratio.

* * * * *

UNITED STATES PATENT AND TRADEMARK OFFICE
CERTIFICATE OF CORRECTION

PATENT NO. : 11,470,457 B2
APPLICATION NO. : 16/770971
DATED : October 11, 2022
INVENTOR(S) : Yejian Chen It is certified that error appears in the above-identified patent and that said Letters Patent is hereby corrected as shown below:

In the Claims

In Column 10, Line 65, Claim 10, delete "he" and insert -- the --, therefor.

Signed and Sealed this
Twentieth Day of June, 2023

Katherine Kelly Vidal
*Director of the United States Patent and Trademark Office*